Patented Aug. 13, 1946

2,405,842

UNITED STATES PATENT OFFICE 2,405,842

METHOD OF MAKING DIALLYL PHTHALATE

John K. Magrane, Highland Park, Amos Raymond Esterly, Metuchen, and Richard E. Davies, Plainfield, N. J., assignors to Catalin Corporation of America, a corporation of Delaware No Drawing. Application April 8, 1944, Serial No. 530,229

7 Claims. (Cl. 260—475)

This invention relates to diallyl phthalate and particularly to a convenient and economical method for making diallyl phthalate in practically water white form.

Diallyl phthalate is used in plastic compositions. It is important that the phthalate be available at low cost and in nearly or entirely colorless condition.

The process that is commonly used in making most esters, namely, the esterification of the appropriate alcohol and acid, has been understood heretofore as being unsatisfactory as a means of preparing diallyl phthalate. It has been understood that the allyl alcohol undergoes rearrangement to an isomeric aldehyde in the presence of the sulfuric acid or other mineral acid catalysts of esterification.

Conventional methods of making diallyl phthalate require the reaction of phthalyl chloride with allyl alcohol, ester exchange, or making sodium monoallyl phthalate and then reacting that intermediate with allyl chloride. We have now discovered, however, that the usual esterification process utilizing the alcohol and acid anhydride may be used satisfactorily in making diallyl phthalate provided the product is subjected to treatment to remove the colored materials that are formed during the esterification.

Briefly stated, the invention comprises the esterification of allyl alcohol with phthalic anhydride (this term including phthalic acid) in the presence of an acid catalyst of esterification, neutralizing and distilling the product, to give a crude dialyl phthalate that is colored, treating the colored product so obtained to cause the coloring material present to become separable from the diallyl phthalate, and then separating the said coloring material and diallyl phthalate. In the preferred embodiment of the invention, the said treating to cause the coloring material to become separable is made by contacting the crude diallyl phthalate with an alkali of which an aqueous solution of sodium hydroxide is the preferred material, washing the product of the alkali treatment to dissolve out the alkali and also the coloring material which is made water soluble and extractable by the alkali treatment, and then, if desired, distilling the product. In a modification of the invention, the treatment to make the coloring material separable is effected by aging the mixture of diallyl phthalate and coloring material for a period of several days or longer and preferably about three weeks and then distilling the remaining product, the coloring material during the said aging process becoming substantially non-volatile so that it does not distil with the diallyl phthalate.

It will be understood that the distillation referred to herein in connection with diallyl phthalate itself is vacuum distillation such as is conventional in the distillation of the phthalate esters, particularly phthalates of the lower alcohols of the saturated or unsaturated series.

When the treatment to make the coloring material separable is effected in the presence of substantial concentrations of the sodium hydroxide or like alkali, only a short period of time is required, as, for example, about 5 to 60 minutes, 10 to 20 minutes of good contact being ordinarily used. When, however, the treatment is effected without the use of strong alkali and is essentially an aging step, then a much longer time is required. Thus, the aging step for effecting the conversion of the coloring material in the crude diallyl phthalate fraction to separable material requires standing of the crude diallyl phthalate for several days and suitably for a period of at least a week. The longer the material stands, the less colored is the product obtained by distillation. While a large improvement in the color of the distilled ester is effected by aging for a week or somewhat less, better and practically water white material is obtained by aging for three weeks or longer before distillation.

In general, the aging in the absence of added strong alkali is continued until test of a small portion of the material, on vacuum distillation test, shows by absence of appreciable color of the distillate that the coloring material is no longer volatile under conditions which cause distillation of the diallyl phthalate.

While the invention is not liimted to any theory of explanation of the results obtained, it is considered that the alkali treatment decreases the volatility of the coloring material present, which is believed to be aldehydic to a substantial extent, and also solubilizes the coloring material by increasing the coefficient of distribution of the coloring material between water and diallyl phthalate, so that the coloring material becomes water soluble and extractable. The effect of longer aging without use of strong alkali is considered as due to progressive polymerization of the aldehydic or other coloring materials, to give final compounds that are so complex as not to be volatile to any substantial extent in vacuo, as under the conditions of distillation of the diallyl phthalate.

Temperatures below those at which refined diallyl phthalate undergoes substantial discoloration or polymerization are used in treatment of the diallyl phthalate, either for the very short period of time with the strong alkali or in the longer aging period without the addition of any strong alkali. Thus the treatments are ordinarily effected at a temperature below 40° C. and preferably at about room temperatures or below, say temperatures between 20° C. and the temperature of crystallizing of any ingredient of the mixture during the treatment, as the freezing point of water in the aqueous solution of alkali when such a solution is used in the treatment of the crude diallyl phthalate.

In the alkali treatment various concentrations of the alkali and various periods of time may be used. The higher the concentration, the shorter the time required for the treatment. When the concentration of alkali is objectionably low, then the time of treatment required is longer than is desirable in commercial operations. When the concentration is too high, there is saponification of the diallyl phthalate ester to an objectionable extent. In general, the concentration of alkali may be varied within wide limits, according to the time which is permitted for effecting the treatment. Ordinarily a concentration of 5 to 35 parts of the alkali to 100 parts of its solution is very satisfactory, a concentration of 10 to 15% being recommended as one which will act rapidly with the coloring material present without causing objectionable saponification.

Sodium hydroxide is entirely satisfactory as the alkali for the treatment. Because of its low cost, it is preferred. Other alkali metal hydroxide or strong water soluble base may be substituted for the sodium hydroxide. Among such other bases that may be used are the quaternary ammonium bases, e. g. trimethyl benzyl ammonium hydroxide or tetraethanol ammonium hydroxide, and the amines such as dimethyl amine, triethanol amine, and monoethyl amine. Bases weaker than the fixed alkalies are used in somewhat larger amounts, in order to give the desired high pH for the rapid solubilizing of the coloring material to water soluble and separable form. There is no gain, however, from the use of the organic bases in place of sodium hydroxides and they are more difficult to separate by subsequent washing than is the less expensive and entirely effective sodium hydroxide.

The invention will be further illustrated by description in connection with the following examples of the making and purification of diallyl phthalate.

*Example 1*

In this example, the following materials are mixed in the proportions shown:

|  |  | Parts |
|---|---|---|
| Phthalic anhydride | (6 mols) | 880 |
| Allyl alcohol in excess | (13.2 mols) | 765 |
| Toluene |  | 930 |
| Concentrated sulfuric acid |  | 15 |

It will be noted that no saturated alcohol is used in the composition.

The mixture was refluxed gently in conventional esterification apparatus fitted with a usual reflux tube and also a down condenser leading to a water trap to receive the mixture of toluene and water which rises through the reflux part of the apparatus and then flows down through the condenser. Water was drawn from the bottom of this trap from time to time and the toluene returned to the still continuously, all in accordance with usual esterification technique.

During three hours of refluxing, there was withdrawn from the trap 159 parts of water, this water containing some dissolved allyl alcohol which distilled with the toluene and water. Since the collection of additional water in the trap had practically ceased after three hours, it was evident that no substantial further esterification was taking place in the refluxed mixture.

The product remaining in the still was then partly distilled at atmospheric pressure to remove a foreshot of toluene and unreacted excess allyl alcohol until the temperature of vapor being distilled rose to 106° C.

Then 20.7 parts of anhydrous finely divided potassium carbonate were added to the still contents, to neutralize the sulfuric acid catalyst.

Distillation was resumed and continued until there was obtained a total of 840 parts of distillate including the foreshot above.

Then vacuum distillation was resorted to and an additional 140 parts of distilled material was obtained at a pressure of 30 to 40 mm., this material still consisting chiefly of toluene and other low boiling materials originally present in the refluxed material.

The residue containing the diallyl phthalate was then distilled at a pressure of 3 mm., to give 1,333 parts of crude diallyl phthalate (boiling point 155–160° C. at 3 mm.). The distillate so obtained was yellow in color. It remained yellow after repeated vacuum distillation, both with and without treatment with activated charcoal of kind normally of high decolorizing power for such colored liquids.

The yellow crude diallyl phthalate obtained by the vacuum distillation described was aged until a test portion removed and vacuum distilled gave a practically white product. In this example, the aging was for a period of three weeks at room temperature. On redistillation in vacuo after that time, there was obtained a practically water white product, the distillation being effected at 5 mm. and the boiling point of the material at this pressure being about 165 to 167° C.

The aging is referred to above as being conducted at about 40° C. or less. Under such conditions there is no objectionable polymerization of the diallyl phthalate during the aging process. Somewhat higher temperatures of aging may be used in the presence of inhibitors of polymerization of materials of the type of diallyl phthalate, examples of such compounds that are well known as inhibitors of polymerization and that may be used for the present purpose being hydroquinone, resorcinol, pyrogallol, and copper filings.

*Example 2*

A quantity of the crude yellow diallyl phthalate prepared by the original vacuum distillation at 3 mm., as described in Example 1, was agitated thoroughly with about 10% of its weight of aqueous sodium hydroxide solution of 25% concentration.

The whole was then allowed to stand until the alkali solution separated as a lower layer below the diallyl phthalate. The alkali layer so separated was found to contain most of the color. This alkali layer was drawn off. (The agitation with the alkali solution, separation, and drawing off may be repeated a number of times, but ordinarily the repeating is not necessary.) The thus extracted diallyl phthalate was then washed twice with distilled water, the wash water separated, and the remaining product then washed once with water containing about 2 to 10% of dissolved sodium chloride. The purpose of the salt is to prevent emulsification of the diallyl phthalate which tends to occur once the wash water has removed from the diallyl phthalate composition most of the alkali used originally to treat the diallyl phthalate and when present acting as an electrolyte to decrease emulsification.

During the washing, the diallyl phthalate becomes progressively lighter in color. The washing with water (and with the solution of an added electrolyte at the end of the washing) was continued until substantially no more color is removed by repeated washing.

The diallyl phthalate so treated and washed was then dried over granular calcium chloride and distilled. The first 5% or so of the distillate was very pale yellow and the remaining distillate was practically water white.

In place of the salt used in this example there may be substituted other electrolytes as, for example, potassium sulfate, calcium chloride, or other salt. Acidic or basic electrolytes are not recommended in the final washing, as it is desired to have at the conclusion of the washing a practically neutral ester.

The sodium hydroxide used in solubilizing the coloring material in Example 2 was introduced in aqueous solution in the crude ester. While an alcoholic solution of the alkali or powdered alkali may be used, the aqueous solution is recommended. When an alcoholic solution of the selected alkali is used, this brings the ester and the alkali into the same phase and increases the saponification without giving any offsetting advantage over the aqueous solution. Solid alkali is inconvenient. Furthermore, somewhat more water must be added to cause separation and washing out of the alkali added originally in alcoholic solution or solid form than required when the alkali is added initially in aqueous solution.

Methods of drying the washed ester other than by calcium chloride may be used, as, for example, cooling the wet ester until the water present freezes and then separating the resulting ice from the liquid ester by decantation or filtration. Also the drying may be made as the initial step in the subsequent distillation of the washed ester. Thus there may be separated the foreshot of the distillation up to the point where the diallyl phthalate itself begins to distil.

*Example 3*

A combination of the processes of Examples 1 and 2 may be used. Thus, a crude diallyl phthalate aged as described in Example 1 is subjected to the alkali treatment and washing process described in Example 2. The aged and subsequently alkali treated and washed product is then dried and distilled. A combination of these two treatments is ordinarily not necessary since the diallyl phthalate made by either Example 1 or 2 is sufficiently colorless to be entirely satisfactory for most purposes.

In general, the formation of a crude distillate of diallyl phthalate as a step preliminary to the treatment described in Examples 1 and 2 to cause the coloring material to be separable is a desirable step. This original distillation, however, may be omitted for some purposes. Thus the diallyl phthalate resulting from the esterification may be aged without previous distillation but after the addition of potassium carbonate or like mild alkali or strong alkali in just the amount to neutralize the acid catalyst of esterification and remaining phthalic acid or anhydride. In the alternative method of making the coloring material separable, the product of the esterification without previous neutralization or distillation is washed directly with a solution of sodium hydroxide or like alkali and then with water, as described under Example 2.

When the crude diallyl phthalate is not distilled before the aging or the strong alkali treatment, the esterification mixture may be partially distilled, to remove to a large extent toluene and other readily volatile materials, before being subjected to aging or alkali washing.

It will be understood that it is intended to cover all changes and modifications of the examples of the invention herein chosen for the purpose of illustration which do not constitute departures from the spirit and scope of the invention.

What we claim is:

1. The method of preparing diallyl phthalate which comprises esterifying allyl alcohol with phthalic anhydride in contact with an acid catalyst of esterification, whereby there is formed diallyl phthalate containing colored volatile aldehydic material, adding an alkali to neutralize the acidity remaining after completion of the esterification, continuing the contact of the alkali with the product of esterification for at least 5 minutes to convert the colored aldehydic material to substantially non-volatile form, and then distilling the diallyl phthalate away from the colored material.

2. The method of making diallyl phthalate which comprises esterifying allyl alcohol substantially free from saturated alcohol with phthalic anhydride in the presence of mineral acid catalyst, whereby there is produced diallyl phthalate containing colored material, agitating the resulting product with an alkali so that acidity is neutralized and the undesired colored material is converted to water soluble and extractable form, and then washing the resulting product with water to remove the alkali metal hydroxide and also the solubilized colored material.

3. The method described in claim 2, the alkali agitated with the diallyl phthalate being an alkali metal hydroxide in aqueous solution.

4. The method described in claim 2, the washing with water being continued until the diallyl phthalate begins to form emulsions with the water and the washing being then continued with an aqueous solution of a salt so as to decrease the tendency of the phthalate to emulsify during the final stages of the washing.

5. The method described in claim 2 including drying the washed product and then distilling the dried product so as to form a practically water white distillate of diallyl phthalate.

6. The method described in claim 2 which comprises neutralizing and distilling the diallyl phthalate before agitation with the said alkali.

7. The method of making diallyl phthalate which comprises esterifying allyl alcohol substantially free from saturated alcohol with phthalic anhydride in the presence of a mineral acid catalyst, contacting the esterified product with an aqueous solution containing 5 to 25% of sodium hydroxide until remaining acidity is neutralized and undesired coloring material present is converted to water soluble and extractable form, and then washing the resulting product with water to remove the remaining alkali metal hydroxide and solubilized coloring material, the temperature of contact of the alkali with the product of the esterification being not substantially above room temperature but above the crystallizing point of any ingredient of the sodium hydroxide solution.

JOHN K. MAGRANE.
AMOS RAYMOND ESTERLY.
RICHARD E. DAVIES.